March 19, 1935. V. J. SAMS ET AL 1,994,874
AUTOMOBILE TIRE PUMP
Filed Aug. 8, 1934    3 Sheets-Sheet 2

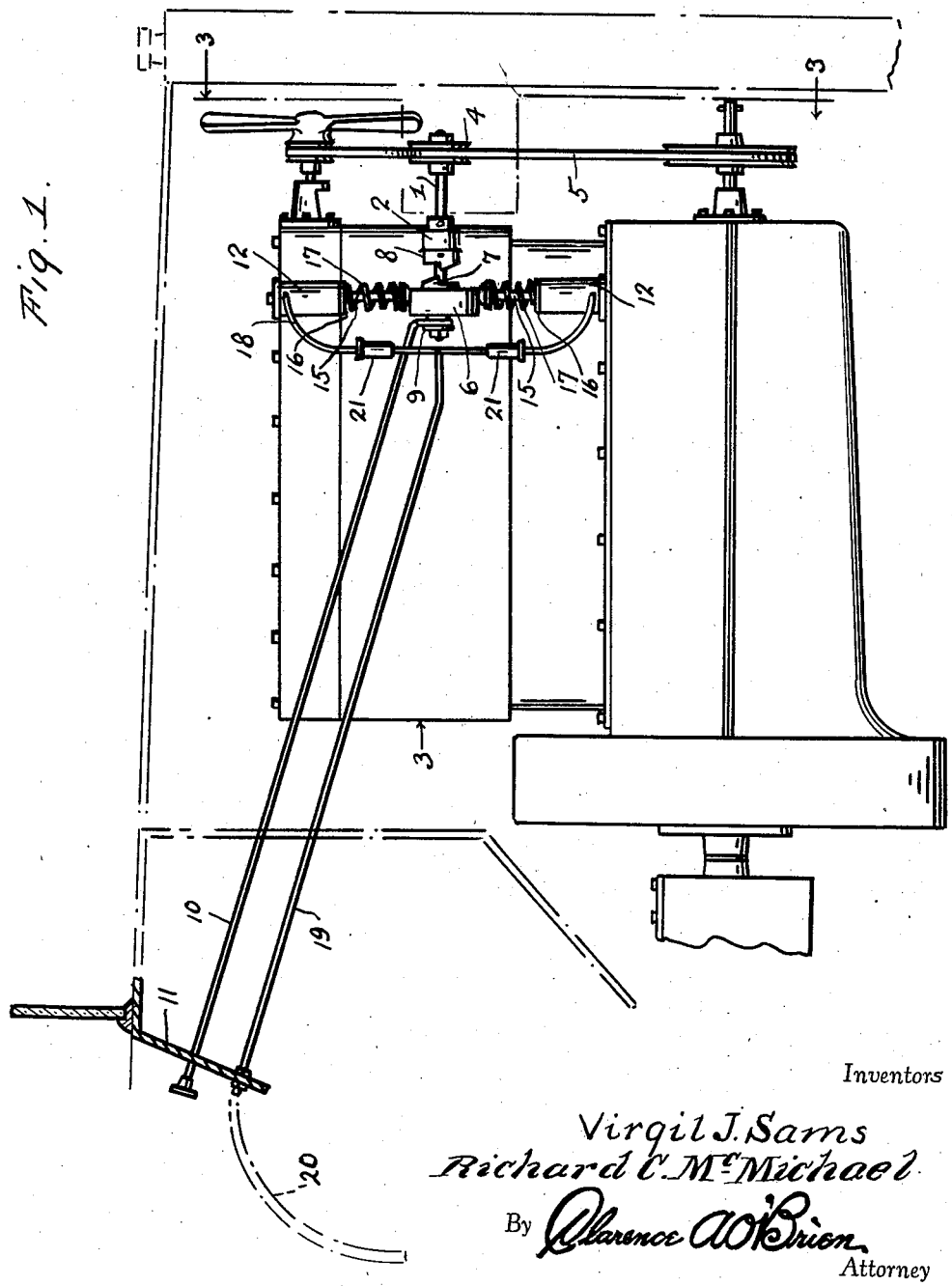

Inventors
Virgil J. Sams
Richard C. McMichael
By Clarence A. O'Brien
Attorney

March 19, 1935.  V. J. SAMS ET AL  1,994,874
AUTOMOBILE TIRE PUMP
Filed Aug. 8, 1934  3 Sheets-Sheet 3
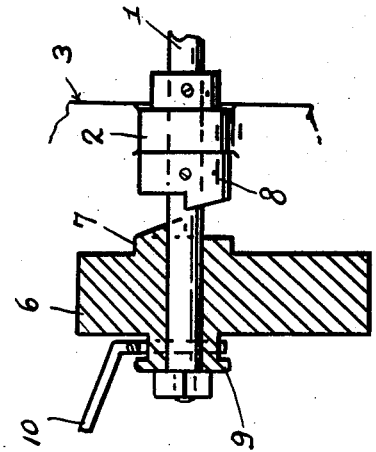
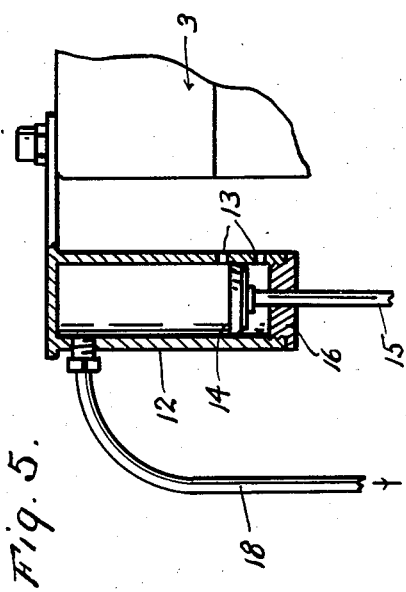
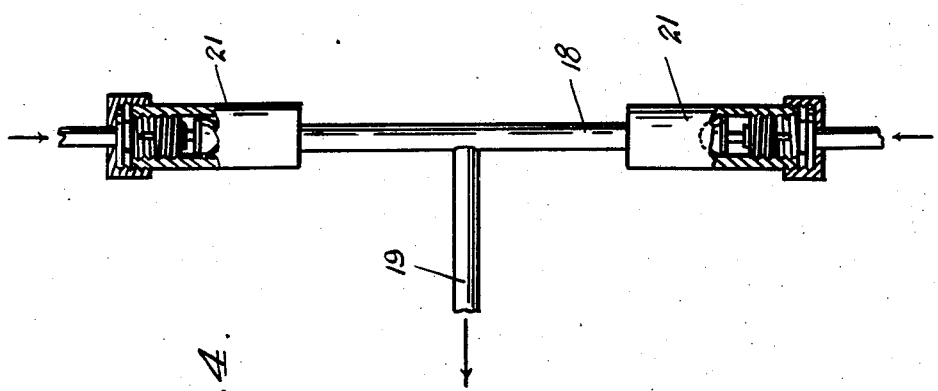
Inventors
Virgil J. Sams
Richard C. McMichael
By Clarence A. O'Brien
Attorney Patented Mar. 19, 1935

1,994,874

UNITED STATES PATENT OFFICE 1,994,874

AUTOMOBILE TIRE PUMP

Virgil James Sams and Richard Clifford McMichael, Orafino, Nebr.

Application August 3, 1934, Serial No. 739,012

2 Claims. (Cl. 230—38)

The present invention relates to new and useful improvements in automobile tire pumps and has for its primary object to provide a device of this character which is permanently mounted on the engine of the automobile and operatively connected to the usual fan belt for actuation thereby.

Another very important object of the invention is to provide a pump of the aforementioned character embodying a novel construction, combination and arrangement of parts through the medium of which said pump may be conveniently rendered operative and inoperative when desired.

Other objects of the invention are to provide a multi-cylinder tire pump for automobiles which will be comparatively simple in construction, strong, durable, highly efficient and reliable in operation, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing a pump in accordance with the present invention installed on an automobile engine.

Figure 4 is a detail view partially in side elevation and partially in section of the check valves and the adjacent portions of the air delivery conduits.

Figure 5 is a detail view in vertical section through the upper cylinder.

Figure 6 is a detail view in vertical section through the cam.

Figure 3:
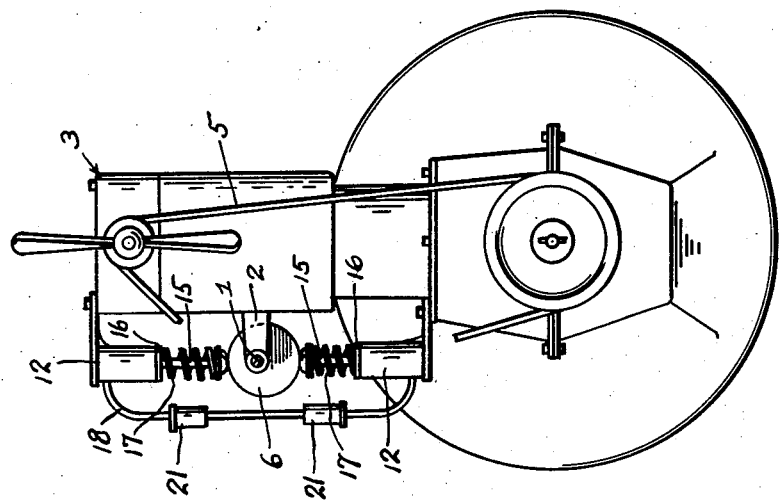
Figure 3 is a view partially in front elevation and partially in transverse section substantially on the line 2—2 of Figure 1.
Figure 2:
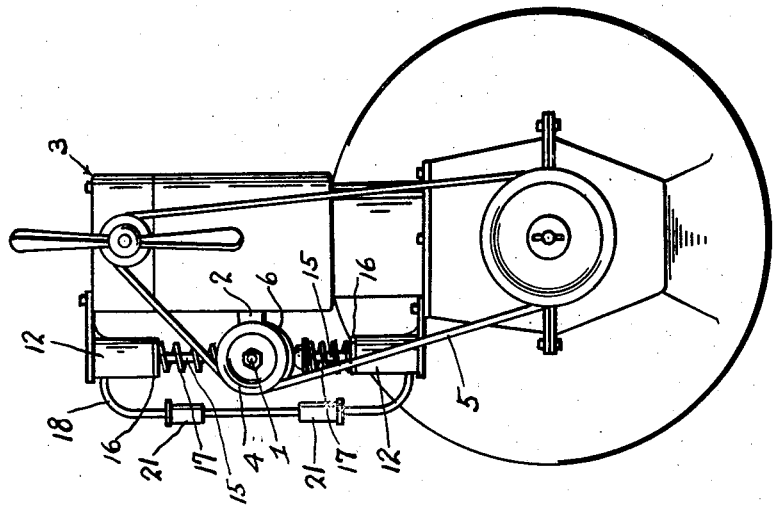
Figure 2 is a view in front elevation thereof.

Referring now to the drawings in detail, it will be seen that the embodiment of the invention which has been illustrated comprises a longitudinal shaft 1 which is journaled in a suitable bearing 2 on the automobile engine which is designated generally by the reference numeral 3. Fixed on the forward end portion of the shaft 1 is a pulley 4 which is driven by the usual fan belt 5 of the engine 3, as illustrated to advantage in Figure 2 of the drawings.

Rotatably and slidably mounted on the rear end portion of the shaft 1 is a cam 6 having fixed on its forward side a clutch member 7 for engagement with a complemental clutch member 8 which is fixed on the shaft 1. Projecting from the rear side of the cam 6 is a flanged extension 9 (see Figure 6) with which an actuating rod 10 is operatively engaged. The rod 10 may extend to the instrument board 11 of the automobile or to any other point for convenient operation by the driver or other occupant of the front seat.

Mounted above and below the cam 6 are cylinders 12 having air openings 13 therein. Pistons 14 are mounted for reciprocation in the cylinders 12, said pistons being fixed on rods 15 which extend slidably through closure disks or plugs 16 which are mounted on the cylinders 12. The piston rods 15 are maintained in yielding engagement with the cam 6 by coil springs 17. A discharge manifold 18 is connected to the cylinders 12.

Connected, at an intermediate point, to the manifold 18 is a delivery pipe 19 which preferably, but not necessarily, extends to the instrument board 11 of the automobile. The delivery pipe 19 is adapted to have detachably connected thereto a flexible inflating hose 20 of sufficient length to reach all of the tires of the automobile. The reference numeral 21 designates check valves, preferably of the Schrader type, which are mounted in the manifold 18 on opposite sides of the delivery pipe 19 for preventing the passage of the air between the cylinders 12. If desired, a valve of this type may also be provided in the rear end portion of the delivery pipe 19.

It is believed that the operation of the pump will be readily apparent. When it is desired to inflate one or more of the tires of the automobile, the cam 6 is moved forwardly on the shaft 1 through the medium of the rod 10 to engage the clutch member 7 with the clutch member 8, thus connecting the cam 6 to said shaft 1 for rotation therewith. Rotation of the cam 6 reciprocates the pistons 14 in the cylinders 12, thus pumping air through the manifold 18 past the valves 21 to the delivery pipe 19 from which said air passes through the flexible hose 20 to the tire with which said hose 20 is connected. When the inflating operation has been completed, the cam 6 is simply shifted rearwardly on the shaft 1 in a manner to disengage the clutch members 7 and 8, thus rendering the pistons 14 inoperative.

It is believed that the many advantages of an automobile tire pump constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:

1. A tire inflating pump adapted to be mounted on automobile engines, the latter including an endless fan belt, comprising a pair of alined cylinders, rods extending slidably into the adjacent ends of the cylinders, a rotary shaft supported on the engine block, a pulley fixed on the shaft and engaged with the fan belt for actuation thereby, a cam rotatably and slidably mounted on the shaft, springs yieldingly engaging the rods with the cam, pistons fixed on the rods and operable in the cylinders, coacting clutch members fixed on the cam and on the shaft for operatively connecting the cam to said shaft, manually operable means for shifting the cam on the shaft for engaging and disengaging the clutch members, and means for conducting air from the cylinders.

2. A tire inflating pump adapted to be mounted on automobile engines, the latter including an endless fan belt, comprising a pair of alined cylinders, rods extending slidably into the adjacent ends of the cylinders, a rotary shaft supported on the engine block, a pulley fixed on the shaft and engaged with the fan belt for actuation thereby, a cam rotatably and slidably mounted on the shaft, springs yieldingly engaging the rods with the cam, pistons fixed on the rods and operable in the cylinders, coacting clutch members fixed on the cam and on the shaft for operatively connecting the cam to said shaft, manually operable means for shifting the cam on the shaft for engaging and disengaging the clutch members, and means for conducting air from the cylinders, said means including a manifold connected to the cylinders, a delivery pipe connected, at an intermediate point, to the manifold, and check valves interposed in the manifold on opposite sides of the delivery pipe.

VIRGIL JAMES SAMS.
RICHARD CLIFFORD McMICHAEL.